US012018520B2

(12) United States Patent
Tanio

(10) Patent No.: US 12,018,520 B2
(45) Date of Patent: Jun. 25, 2024

(54) LOCKING MECHANISM AND IMAGE FORMING APPARATUS

(71) Applicant: KYOCERA Document Solutions Inc., Osaka (JP)

(72) Inventor: Koji Tanio, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 213 days.

(21) Appl. No.: 17/728,000

(22) Filed: Apr. 25, 2022

(65) Prior Publication Data

US 2022/0349230 A1 Nov. 3, 2022

(30) Foreign Application Priority Data

Apr. 30, 2021 (JP) ................................ 2021-077121

(51) Int. Cl.
*G03G 21/16* (2006.01)
*E05D 11/10* (2006.01)

(52) U.S. Cl.
CPC ...... *E05D 11/1007* (2013.01); *E05D 11/1014* (2013.01); *G03G 21/1633* (2013.01); *E05Y 2999/00* (2024.05)

(58) Field of Classification Search
CPC .......... G03G 21/1633; G03G 2221/169; B41J 29/13; E05D 11/1007; E05D 11/1014; E05D 11/105; E05F 5/02; E05Y 2201/71; E05Y 2201/266; E05Y 2900/608; E05Y 2999/00
See application file for complete search history.

(56) References Cited

U.S. PATENT DOCUMENTS

| | | | | |
|---|---|---|---|---|
| 9,709,948 | B2 | 7/2017 | Wakimoto | |
| 2007/0085261 | A1* | 4/2007 | Jang .................... | B65H 3/5223 271/121 |
| 2014/0029997 | A1* | 1/2014 | Tsuchiya | |
| 2021/0389694 | A1* | 12/2021 | Morita | |
| 2023/0036337 | A1* | 2/2023 | Minamoto | |

FOREIGN PATENT DOCUMENTS

| | | |
|---|---|---|
| JP | 2017-003892 A | 1/2017 |

* cited by examiner

*Primary Examiner* — Sophia S Chen
(74) *Attorney, Agent, or Firm* — Studebaker & Brackett PC

(57) ABSTRACT

A locking mechanism for an opening/closing cover supported by an apparatus case in an openable and closable manner includes a rotational gear, a rack gear, a locking member and a spring member. The rotational gear rotates with an opening and closing operation of the opening/closing cover. The rack gear slides with a rotating of the rotational gear. The locking member has a hooking part facing the rack gear. The spring member pushes the hooking part toward the rack gear. The hooking part restricts a sliding of the rack gear in an opened state of the opening/closing cover.

14 Claims, 5 Drawing Sheets

LOCKING MECHANISM AND IMAGE FORMING APPARATUS

INCORPORATION BY REFERENCE

This application is based on and claims the benefit of priority from Japanese patent application No. 2021-077121 filed on Apr. 30, 2021, which is incorporated by reference in its entirety.

BACKGROUND

The present disclosure relates to a locking mechanism and an image forming apparatus.

An image forming apparatus such as a printer is provided with an opening/closing cover for opening and closing an upper surface of an apparatus main body in order to replace a toner container or for the other purpose. Conventionally, as such an opening/closing cover, one provided with a locking mechanism which keeps the opening/closing cover in an opened state is known. To the rotational shaft of the opening/closing cover, a rotary damper is coupled via a transmission gear, and the rotary damper applies resistance against the rotating of the opening/closing cover when it falls down. To the transmission gear, the locking mechanism is coupled, and the locking mechanism locks the rotation of the transmission gear such that the opening/closing cover is kept in the opened state.

However, the above-described locking mechanism is disposed around the transmission gear, and the locking state and the unlocking state of the opening/closing cover is switched according to the rotational position of the transmission gear. This makes the structure of the opening/closing cover complicated.

SUMMARY

In accordance with one aspect of the present disclosure, a locking mechanism for an opening/closing cover supported by an apparatus case in an openable and closable manner includes a rotational gear, a rack gear, a locking member and a spring member. The rotational gear rotates with an opening and closing operation of the opening/closing cover. The rack gear slides with a rotating of the rotational gear. The locking member has a hooking part facing the rack gear. The spring member pushes the hooking part toward the rack gear. The hooking part restricts a sliding of the rack gear in an opened state of the opening/closing cover.

In accordance with one aspect of the present disclosure, an image forming apparatus includes the locking mechanism and the opening/closing cover kept in the opened state using the locking mechanism.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
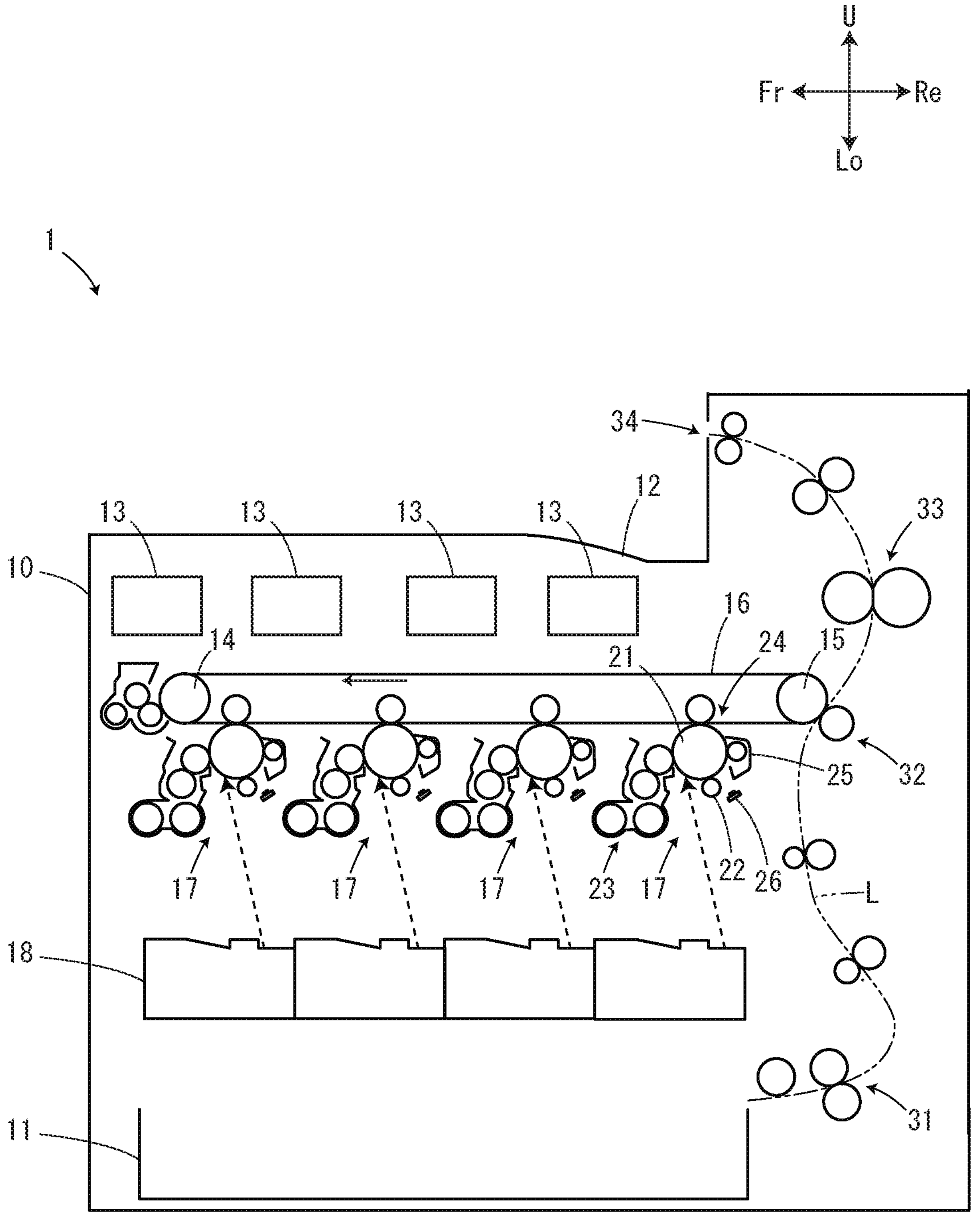
FIG. 1 is a view schematically showing a printer according to one embodiment of the present disclosure.

Hereinafter, with reference to the drawings, an image forming apparatus including a locking mechanism according to the present embodiment will be described. In the following description, a printer will be described as an example of the image forming apparatus. FIG. 1 is a view schematically showing the printer according to the present embodiment. Arrows Fr, Re, U and Lo appropriately attached to the respective drawings indicate the front, rear, upper, and lower sides of the printer, respectively.

As shown in FIG. 1, the printer 1 includes a box-shaped housing (an apparatus case) 10 in which various devices are housed. In the lower portion in the housing 10, a sheet feeding cassette 11 in which a bundle of sheets is set is housed, and in the upper portion in the housing 10, a sheet discharge tray 12 on which the sheets on which an image is formed is stacked is provided. Below the sheet discharge tray 12, a toner container 13 storing toner is detachably set for each color (for example, magenta, cyan, yellow and black) of the toner. Below the toner containers 13, an intermediate transfer belt 16 stretched around a pair of rollers 14 and 15 is provided.

Below the intermediate transfer belt 16, a plurality of image forming units 17 for the colors of the toner are arranged in a row along the front-and-rear direction. Each image forming unit 17 includes a photosensitive drum 21 rotating in contact with the intermediate transfer belt 16. Around the photosensitive drum 21, a charger 22, a development device 23, a primary transfer roller 24, a cleaning device 25 and a charge elimination device 26 are disposed in the order of the primary transfer process. To the cleaning device 25, a waste toner box (not shown) is connected. Each development device 23 is supplied with the toner from the corresponding toner container 13 through a supply passage (not shown). To the waste toner box, the waste toner is discharged from each cleaning device 25 through a discharge passage (not shown).

Below the image forming units 17, an exposure device 18 constituted by a laser scanning unit (LSU) is provided. In the side portion in the housing 10, a conveyance path L for the sheet from the sheet feeding cassette 11 to the sheet discharge tray 12 is formed by a plurality of rollers. A sheet feeding part 31 is provided on the upstream side (the lower side) of the conveyance path L, and a secondary transfer part 32 is provided on the side end of the intermediate transfer belt 16 on the downstream side of the sheet feeding part 31 on the conveyance path L. A fixing device 33 is provided on the downstream side of the secondary transfer part 32 on the conveyance path L, and a sheet discharge port 34 is provided on the downstream end side (the upper side) of the conveyance path L.

At a time of an image forming operation in the printer 1, after the surface of the photosensitive drum 21 is charged by the charger 22, an electrostatic latent image is formed on the surface of the photosensitive drum 21 by laser light from the exposure device 18. Next, the development device 23 supplies the toner to the electrostatic latent image on the surface of the photosensitive drum 21 to form a toner image, and the toner image is primarily transferred from the surface of the photosensitive drum 21 to the surface of the intermediate transfer belt 16. A full-color toner image is formed on the surface of the intermediate transfer belt 16 by primary transferring the toner images of respective colors to the intermediate transfer belt 16 in each image forming unit 17. The waste toner and the charge remaining on the photosensitive drum 21 are removed by the cleaning device 25 and the charge elimination part 26.

On the other hand, the sheet is fed from the sheet feeding feed cassette 11 or the manual sheet feeding tray (not shown) by the sheet feeding part 31, and is conveyed toward the secondary transfer part 32 in timing with the above image forming operation. At the secondary transfer part 32, the full-color toner image is secondarily transferred from the surface of the intermediate transfer belt 16 to the surface of the sheet, and the sheet on which the toner image is transferred is conveyed toward the fixing device 33 on the downstream side of the secondary transfer part 32. In the fixing device 33, the toner image is fixed on the sheet, and the sheet on which the toner image is fixed is discharged through the sheet discharge port 34 onto the sheet discharge tray 12. In the above manner, the toner image transferred to the sheet passes through the fixing device 33 to form an image on the surface of the sheet.

Figure 2:
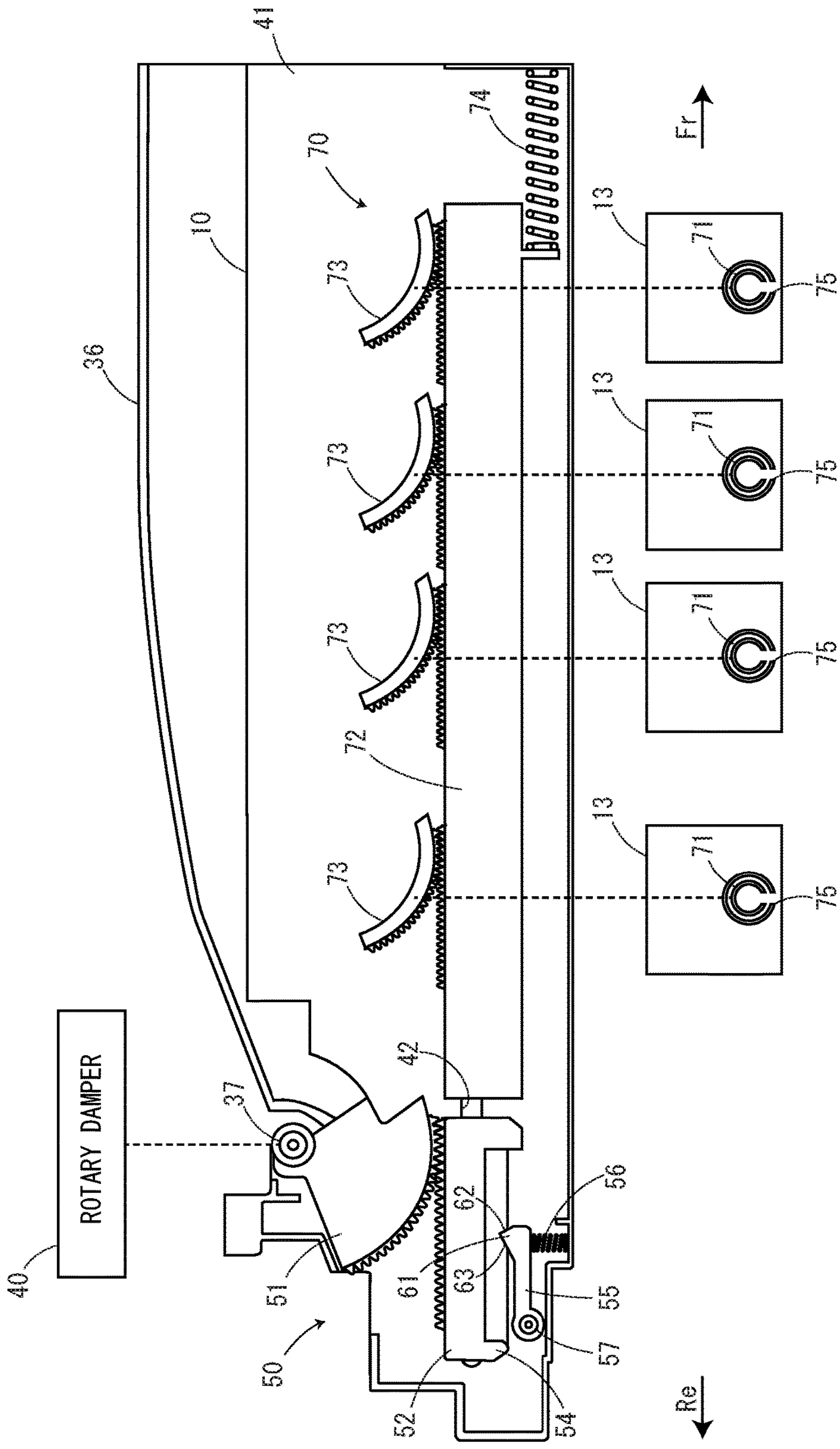
FIG. 2 is a view schematically showing an opening/closing cover and its periphery according to the embodiment of the present disclosure.

By the way, the bottom wall of the sheet discharge tray 12 is constituted by an opening/closing cover 36 (see FIG. 2). By opening the opening/closing cover 36, a replacement of the toner container 13 in the housing 10 and a maintenance work such as a treatment of sheet jamming are performed. During the maintenance work, the opening/closing cover 36 is kept in an opened state by a locking mechanism 50 (see FIG. 2). To one end (the left end, in the present embodiment) of the rotational shaft of the opening/closing cover 36, a rotary damper 40 (see FIG. 2) for applying resistance to the rotating of the opening/closing cover 36 is coupled. To the other end (the right end, in the present embodiment) of the rotational shaft of the opening/closing cover 36, an opening/closing mechanism 70 (see FIG. 2) is provided. The opening/closing mechanism 70 can open and close a shutter of the toner container 13 with the opening and closing of the opening/closing cover 36.

In this case, if the locking mechanism 50 is disposed on the one end side of the rotational shaft of the opening/closing cover 36 in the same manner as the rotary damper 40, the rotary damper 40 limits an installation space for the locking mechanism 50. Further, if the locking mechanism 50 is disposed on an opposite side of the opening/closing mechanism 70 with respect to the rotational shaft of the opening/closing cover 36, a deviation is generated between the movements of the locking mechanism 50 and the opening/closing mechanism 70 owing to the deflection of the opening/closing cover 36. Therefore, the locking mechanism 50 of the present embodiment is connected to the other end of the rotational shaft of the opening/closing cover 36, which is the same as the opening/closing mechanism 70. Further, because the locking mechanism 50 employs a slide locking mechanism, the structure of the locking mechanism 50 is made to be simple.

With reference to FIG. 2, the locking mechanism of the opening/closing cover will be described. FIG. 2 is a view schematically showing the opening/closing cover and its periphery of the present embodiment.

As shown in FIG. 2, the opening/closing cover 36 is supported by a pair of side plates 41 of the housing 10 via a rotational shaft 37 in an openable and closable manner. By lifting the opening/closing cover 36 upward from the upper surface of the housing 10, the opening/closing cover 36 is opened to expose the inside of the housing 10 to the outside. When the opening/closing cover 36 is lowered from the opened state, the opening/closing cover 36 is closed to form the sheet discharge tray 12 (see FIG. 1) on the upper surface of the housing 10. The opening/closing cover 36 is long in the front-and-rear direction so as to cover the four toner containers 13 from above, and its thickness is increased by ribs or the like. Therefore, even if the opening/closing cover 36 is made of synthetic resin or the like, its weight is increased.

The rotary damper 40 is coupled to one end of the rotational shaft 37 of the opening/closing cover 36 via a power transmission mechanism (not shown). The rotary damper 40 applies rotational resistance corresponding to the rotational speed of the opening/closing cover 36. The force when the opening/closing cover 36 falls in the closing direction is weakened by the rotary damper 40 to suppress the impact applied to the opening/closing cover 36 and the housing 10. In the present embodiment, the rotary damper 40 is coupled to the opening/closing cover 36, but when the opening/closing cover having a small weight is used, the rotary damper 40 may not be coupled to the opening/closing cover.

The locking mechanism 50 is coupled to the other end of the rotational shaft 37 of the opening/closing cover 36. Since the locking mechanism 50 is provided on the opposite side to the rotary damper 40 with respect to the rotational shaft 37 of the opening/closing cover 36, the installation space for the locking mechanism 50 is sufficiently secured. The locking mechanism 50 includes a rotational gear 51 rotating with the opening and closing operation of the opening/closing cover 36, and a rack gear 52 sliding with the rotation of the rotational gear 51. By the combination of the rotational gear 51 and the rack gear 52, the opening and closing operation of the opening/closing cover 36 is converted into the sliding operation of the rack gear 52. The opening/closing cover 36 is kept in the opened state by locking the sliding of the rack gear 52.

The rotational gear 51 is a sector gear having a substantially fan shape, and is provided on the other end of the rotational shaft 37 of the opening/closing cover 36. The rotational gear 51 is rotated within a range of a predetermined angle around the rotational shaft 37 of the opening/closing cover 36 in a reciprocating manner. The rack gear 52 is slidably installed in a slit 42 of the side plate 41 of the housing 10. Rack teeth meshing with the outer tooth of the rotational gear 51 are formed on the upper surface of the rack gear 52, and a projection 54 projects from the rear end portion of the lower surface of the rack gear 52. By rotating the rotational gear 51 in a reciprocating manner, the rack gear 52 slides along the slit 42, and the projection 54 of the rack gear 52 moves in the front-and-rear direction.

The locking mechanism 50 further includes a locking member 55 which locks the sliding of the rack gear 52 and a spring member 56 which supports the locking member 55 from below. The locking member 55 is turnably supported by the side plate 41 via a turning shaft 57 provided below the rack gear 52. The locking member 55 extends forward from the turning shaft 57, and a hooking part 61 facing the rack gear 52 is formed at the front end of the locking member 55. The hooking part 61 is formed in a mountain-like shape in a side view having a front steep inclined surface 62 and a rear gentle inclined surface 63. The spring member 56 is disposed just below the hooking part 61, and the hooking part 61 is pushed up toward the rack gear 52 by the spring member 56.

The projection 54 projects from the rack gear 52 toward the locking member 55, and the hooking part 61 projects from the locking member 55 toward the rack gear 52. In the closed state of the opening/closing cover 36, the projection 54 of the rack gear 52 is separated rearward from the hooking part 61 of the locking member 55. In the opened state of the opening/closing cover 36, the projection 54 of the rack gear 52 comes into contact with the hooking part 61 of the locking member 55 from the front (see FIG. 5). Although a rearward force is applied on the rack gear 52, the projection 54 of the rack gear 52 is hooked by the hooking part 61 of the locking member 55, and the sliding of the rack gear 52 is restricted. Thus, the opening/closing cover 36 is maintained in the opened state.

In front of the rack gear 52, the opening/closing mechanism 70 is provided. The opening/closing mechanism 70 opens and closes shutters 71 for closing replenishment ports 75 of the four toner containers 13 with the sliding of the rack gear 52. The opening/closing mechanism 70 includes a rack bar 72 extending in the front-and-rear direction along which the four toner containers 13 are disposed, and four opening/closing gears 73 rotating with the sliding of the rack bar 72. The rack bar 72 of the opening/closing mechanism 70 is adjacent to the rack gear 52 of the locking mechanism 50, and the rack bar 72 can be pushed forward by sliding of the rack gear 52. A spring member 74 is connected to the rack bar 72, and the rack bar 72 is pushed back by the spring force of the spring member 74.

Each opening/closing gear 73 is an arc-shaped sector gear, and is attached to the toner container 13. Shutter 71 of each toner container 13 is connected to each opening/closing gear 73, and the shutter 71 is opened/closed by rotating of each opening/closing gear 73. In a state where the rack gear 52 of the locking mechanism 50 is separated from the rack bar 72 of the opening/closing mechanism 70, that is, in a state where the opening/closing cover 36 is closed, the shutters 71 are opened to open the replenishment ports 75 of the toner containers 13. In a state where the rack gear 52 of the locking mechanism 50 pushes the rack bar 72 of the opening/closing mechanism 70, that is, in a state where the opening/closing cover 36 is opened, the shutters 71 are closed to close the replenishment ports 75 of the toner containers 13.

In the above manner, the rack gear 52 of the locking mechanism 50 is also used for the opening/closing mechanism 70, thereby reducing the number of components. Further, the opening/closing mechanism 70 is provided on the other end side of the rotational shaft 37 of the opening/closing cover 36, in the same manner as the locking mechanism 50 (the rack gear 52), among both the end sides of the rotational shaft 37 of the opening/closing cover 36. Since the locking mechanism 50 and the opening/closing mechanism 70 are interlocked without the opening/closing cover 36, even if the opening/closing cover 36 is deflected, a deviation between the movements of the locking mechanism 50 and the opening/closing mechanism 70 is not generated. Thus, when the opening/closing cover 36 is kept in the opened state, the replenishment port 75 of the toner container 13 can be surely closed by the shutter 71.

Figure 3:
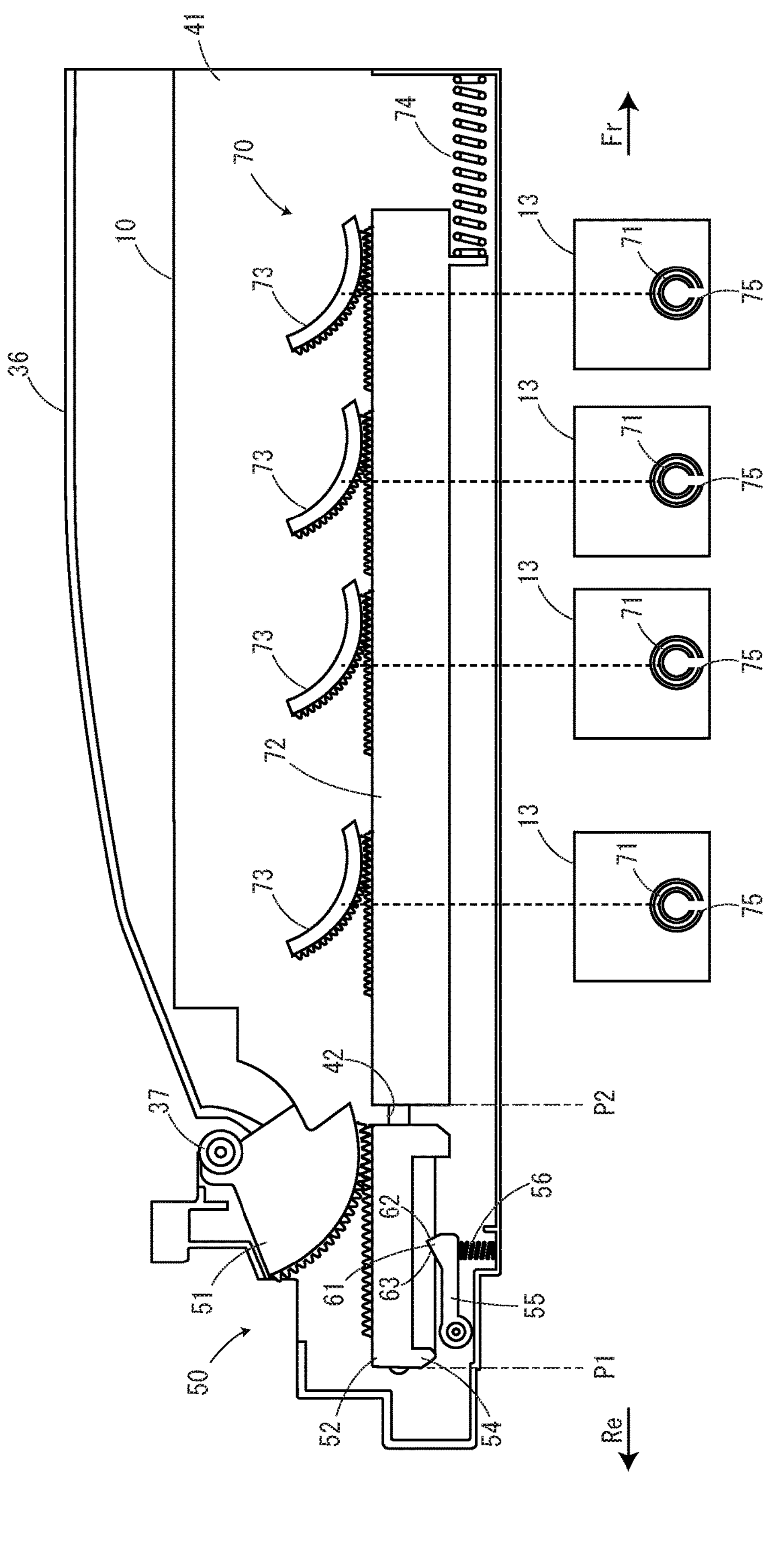
FIG. 3 is a view schematically showing the opening/closing cover in a closed state, according to the embodiment of the present disclosure.
Figure 4:
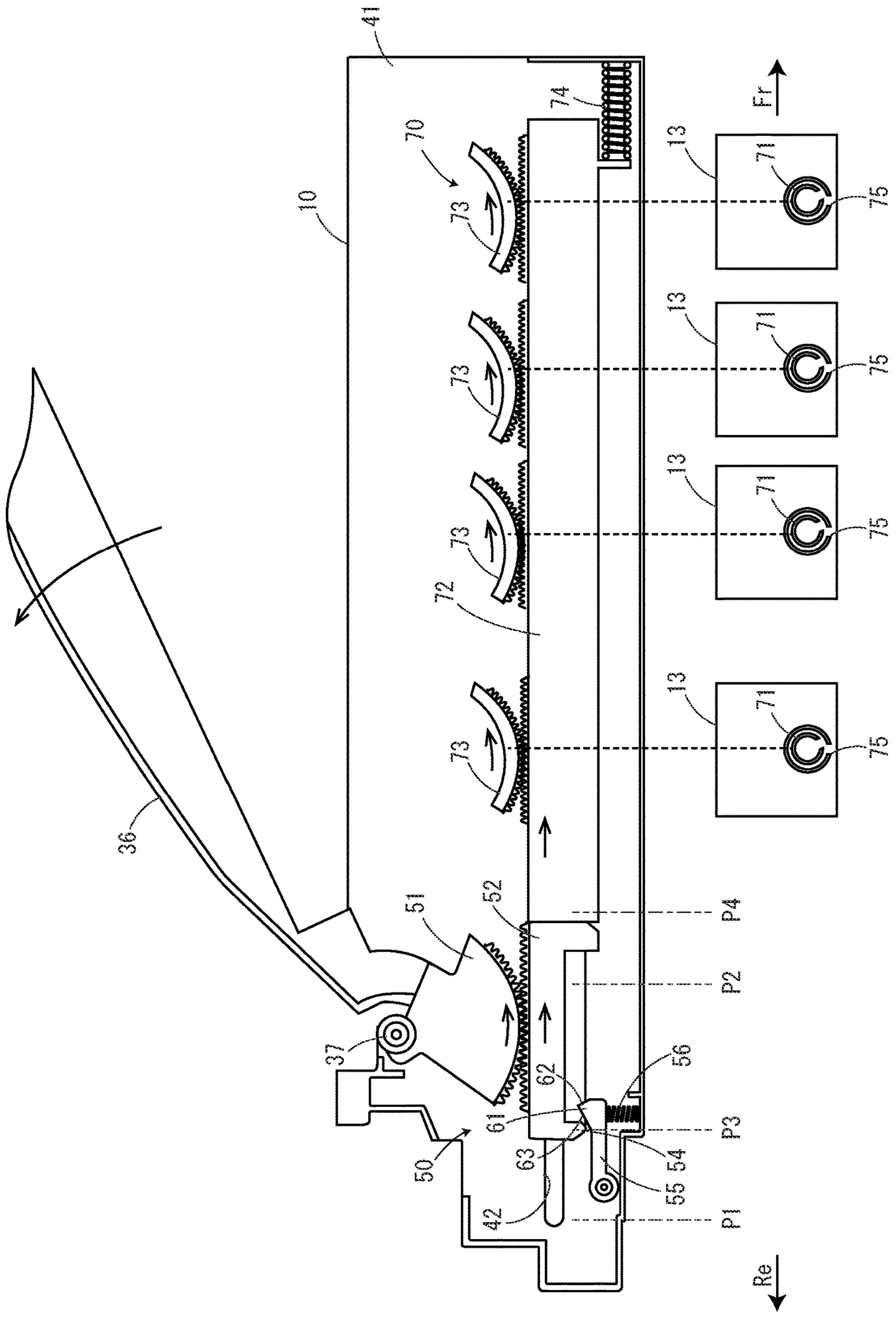
FIG. 4 is a view schematically showing the opening/closing cover in a middle of an opening operation, according to the embodiment of the present disclosure.
Figure 5:
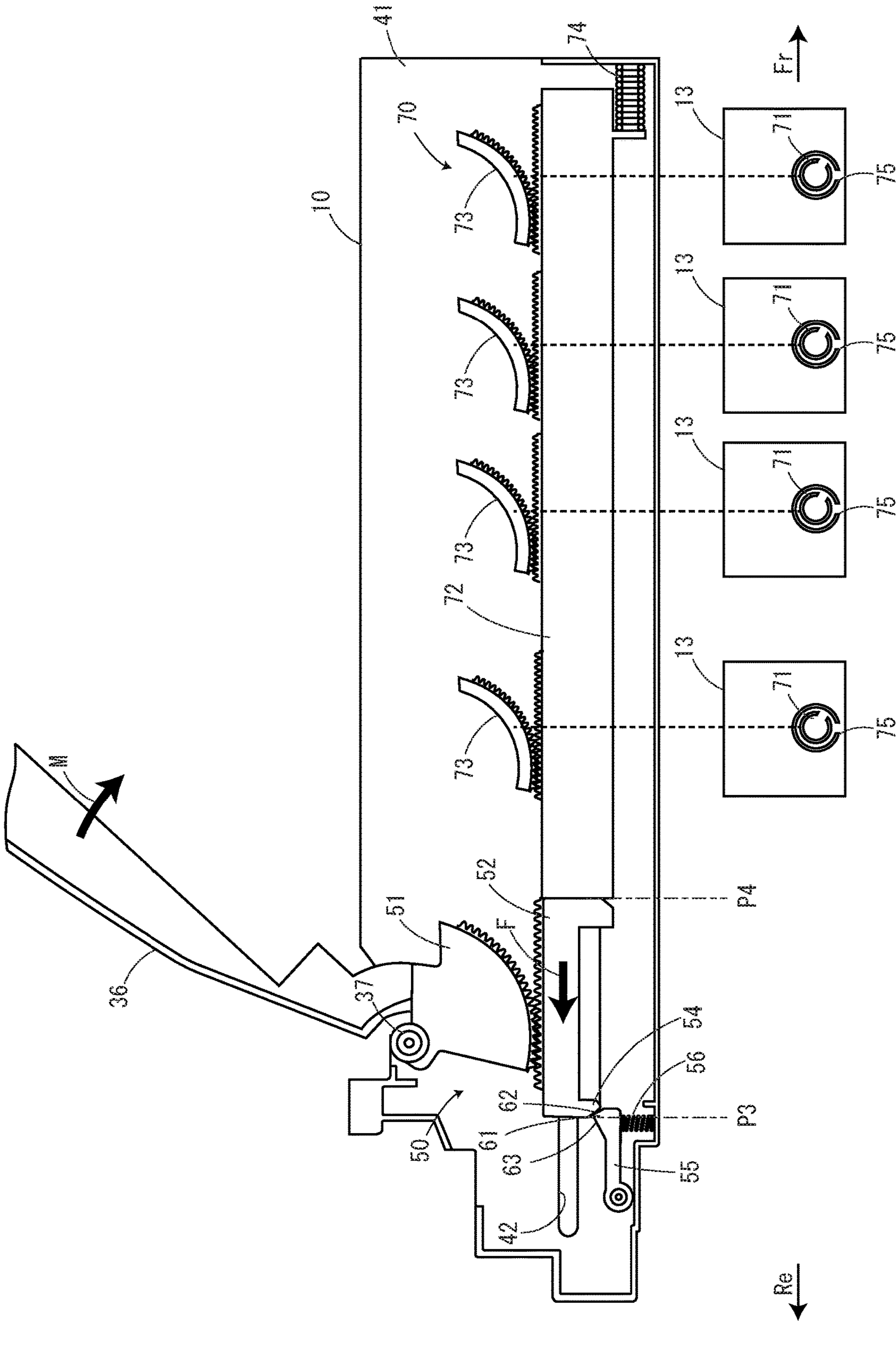
FIG. 5 is a view schematically showing the opening/closing cover in an opened state, according to the embodiment of the present disclosure.

With reference to FIG. 3 to FIG. 5, the opening/closing operation of the opening/closing cover will be described. FIG. 3 is a view schematically showing the opening/closing cover in the closed state, in the present embodiment. FIG. 4 is a view schematically showing the opening/closing cover in a middle of the opening operation, in the present embodiment. FIG. 5 is a view schematically showing the opening/closing cover in the opened state, in the present embodiment.

As shown in FIG. 3, when the opening/closing cover 36 is closed, the outer edge of the opening/closing cover 36 is supported by the housing 10 from below. At this time, the rotational gear 51 provided in the rotational shaft 37 of the opening/closing cover 36 is meshed with the front end portion of the rack gear 52, and the rack gear 52 is positioned in a rear position P1 corresponding to the closed state of the opening/closing cover 36. When the rack gear 52 is in the rear position P1, the projection 54 provided in the rear end portion of the rack gear 52 is separated rearward from the hooking part 61 provided in the front end portion of the locking member 55. The hooking part 61 of the locking member 55 is pushed up by the spring member 56, and the apex of the hooking part 61 is positioned above the lower surface of the projection 54.

The rack bar 72 of the opening/closing mechanism 70 is separated from the rack gear 52 of the locking mechanism 50. The rack bar 72 is positioned in an open position P2 by the spring member 74. When the rack bar 72 is in the open position P2, each opening/closing gear 73 is meshed with the front end portion of the rack teeth of the rack bar 72, and the shutter 71 connected to each opening/closing gear 73 is opened. In this manner, in the state where the opening/closing cover 36 is closed, no operating force is applied from the rack gear 52 of the locking mechanism 50 to the rack bar 72 of the opening/closing mechanism 70, and the shutters 71 are opened to open the replenishment ports 75 of the toner containers 13.

As shown in FIG. 4, when the opening/closing cover 36 is rotated in the opening direction by the user, the rotational gear 51 provided in the rotational shaft 37 of the opening/closing cover 36 is rotated in the counterclockwise direction. Then, the meshed area between the rotational gear 51 and the rack gear 52 is shifted rearward from the front end side, and the rack gear 52 positioned in the rear position P1 begins to slide toward a front position P3. When the projection 54 of the rack gear 52 comes into contact with the hooking part 61 of the locking member 55, the hooking part 61 is pushed downward by the projection 54 against the spring force of the spring member 56. Then, as the rack gear 52 is slid, the projection 54 of the rack gear 52 gets over the hooking part 61 of the locking member 55.

Further, the rack gear 52 of the locking mechanism 50 comes into contact with the rack bar 72 of the opening/closing mechanism 70. The rack bar 72 is pushed in by the rack gear 52 against the spring force of the spring member 74. When the rack bar 72 moves forward from the open position P2 toward a close position P4, the meshing areas between the opening/closing gears 73 and the rack bar 72 shift backward from the front end side, and the opening/closing gears 73 rotate in the counterclockwise direction. Then, the shutter 71 connected to each opening/closing gear 73 begins to move in the closing direction, and the replenishment port 75 of each toner container 13 begins to be closed by each shutter 71. As described above, an operating force is applied from the rack gear 52 of the locking mechanism 50 to the rack bar 72 of the opening/closing mechanism 70.

As shown in FIG. 5, when the opening/closing cover 36 is fully opened, the opening/closing cover 36 rises to open the upper surface of the housing 10. At this time, the rotational gear 51 provided in the rotational shaft 37 of the opening/closing cover 36 is meshed with the rear end portion of the rack gear 52, and the rack gear 52 is positioned in the front position P3 corresponding to the opened state of the opening/closing cover 36. When the rack gear 52 is in the front position P3, the projection 54 of the rack gear 52 is in contact with the hooking part 61 of the locking member 55 from the front. The projection 54 of the rack gear 52 is hooked by the hooking part 61 of the locking member 55, and the sliding of the rack gear 52 is restricted.

More specifically, in the opened state of the opening/closing cover 36, a rearward operating force F is applied on the rack gear 52 by a moment M acting on the opening/closing cover 36. The projection 54 of the rack gear 52 comes into contact with the steep inclined surface 62 of the hooking part 61 of the locking member 55, and the hooking part 61 is pushed up by the spring member 56. The projection 54 of the rack gear 52 cannot get over the hooking part 61 of the locking member 55, and the rearward sliding of the rack gear 52 is restricted by the hooking part 61 of the locking member 55. As a result, even when the user releases his/her hand from the opening/closing cover 36, the opening/closing cover 36 is kept in the opened state.

Further, the rack bar 72 of the opening/closing mechanism 70 is pushed in by the rack gear 52 of the locking mechanism 50, and the rack bar 72 is positioned in the close position P4. When the rack bar 72 is in the close position P4, each opening/closing gear 73 is meshed with the rear end portion of the rack teeth of the rack bar 72, and the shutter 71 connected to each opening/closing gear 73 is closed. In this manner, when the opening/closing cover 36 is opened, an operating force is applied from the rack gear 52 of the locking mechanism 50 to the rack bar 72 of the opening/closing mechanism 70, and the shutters 71 are closed to close the replenishment ports 75 of the toner containers 13.

When the user rotates the opening/closing cover 36 from the opened state in the closing direction, the hooking of the rack gear 52 with the hooking part 61 of the locking member 55 is released. That is, the projection 54 of the rack gear 52 strongly abuts against the steep inclined surface 62 of the hooking part 61, and the hooking portion 61 is pushed down against the spring force of the spring member 56. When the projection 54 of the rack gear 52 is detached from the hooking part 61 of the locking member 55, the rearward sliding of the rack gear 52 is allowed. Then, the respective gears of the locking mechanism 50 and the opening/closing mechanism 70 move in the opposite direction to close the opening/closing cover 36, and the respective shutters 71 are opened to open the replenishment ports 75 of the respective toner containers 13.

As described above, according to the present embodiment, with the opening and closing operation of the opening/closing cover 36, the rotational gear 51 is rotated to slide the rack gear 52. The hooking part 61 of the locking member 55 is pushed toward the rack gear 52 by the spring member 56. When the opening/closing cover 36 is opened, the rack gear 52 is hooked with the hooking part 61 to prevent the sliding of the rack gear 52. Therefore, it becomes possible to keep the opening/closing cover 36 in the opened state using a simple structure. Further, by keeping the opening/closing cover 36 in the opened state, it becomes possible to improve the workability of the replacement of the toner container 13 and the maintenance work such as the sheet jamming treatment.

In the present embodiment, an example in which the rotational gear is a sector gear is described, but, the rotational gear may be a gear that rotates with the opening and closing operation of the opening/closing cover. For example, the rotating gear may be a spur gear.

Further, in the present embodiment, the locking member is formed with the convex hooking part and the rack gear is formed with the projection, but the shapes of the locking member and the rack gear are not particularly limited. For example, the hooking part of the locking member may be formed in a concave shape, and the projection of the rack gear may be hooked with the concave hooking part. Further, a recess may be formed in the rack gear, and the recess of the rack gear may be hooked with a convex hooking part. Further, as long as the rack gear can be engaged with the hooking part of the locking member, the rack gear may have no projection or recess.

In the present embodiment, the opening/closing mechanism includes the rack bar, the opening/closing gear, and the spring member, but the opening/closing mechanism may be configured to open/close the shutter in accordance with the sliding of the rack gear.

In the present embodiment, the sheet may be in the form of a sheet on which an image to be formed, and may be a plain paper, a coated paper, a tracing paper, or an overhead projector (OHP) sheet, for example.

In the present embodiment, a printer is shown as an example of the image forming apparatus, but the present invention is not limited to this configuration. The image forming apparatus may be a multifunction peripheral having a printing function, a copying function, a facsimile function, or the like in combination, in addition to a copying machine and a facsimile machine.

Although the present embodiment has been described, as another embodiment, the above-described embodiment and the modified embodiment may be wholly or partially combined.

The techniques of the present disclosure are not limited to the embodiments described above, and may be changed, replaced, or modified in various ways without departing from the spirit of the technical philosophy. Further, if the technical idea can be realized in another way by the progress of the technology or another technique derived from the technology, the method may be used. Accordingly, the claims cover all embodiments that may be included within the scope of the technical idea.

The invention claimed is:

1. A locking mechanism for an opening/closing cover supported by an apparatus case in an openable and closable manner, the locking mechanism comprising:

a rotational gear rotating with an opening and closing operation of the opening/closing cover;

a rack gear sliding with a rotating of the rotational gear;

a locking member having a hooking part facing the rack gear;

a spring member pushing the hooking part toward the rack gear; and an opening/closing mechanism which can open and close a shutter closing a replenishment port of a toner container, the opening/closing mechanism provided on the same side as the rack gear, among both ends of a rotational shaft of the opening/closing cover, wherein the shutter can be opened and closed with the sliding of the rack gear, and the hooking part restricts a sliding of the rack gear in an opened state of the opening/closing cover.

2. The locking mechanism according to claim 1, wherein the rack gear has a projection projecting toward the locking member, and the hooking part hooks the projection to restrict the sliding of the rack gear in the opened state of the opening/closing cover.

3. The locking mechanism according to claim 2, wherein the rack gear is slidable along a front-and-rear direction, and the projection is projected from a rear end portion of a lower surface of the rack gear.

4. The locking mechanism according to claim 1, wherein the locking member is turnable, and the hooking part is formed in a front end portion of the locking member so as to project toward the rack gear.

5. The locking mechanism according to claim 1, further comprising:

a rotary damper coupled to one end of a rotational shaft of the opening/closing cover, wherein the rotational gear is provided in the other end of the rotational shaft of the opening/closing cover.

6. An image forming apparatus comprising:

the locking mechanism according to claim 1; and the opening/closing cover kept in the opened state using the locking mechanism.

7. A locking mechanism for an opening/closing cover supported by an apparatus case in an openable and closable manner, the locking mechanism comprising:

a rotational gear rotating with an opening and closing operation of the opening/closing cover;

a rack gear sliding with a rotating of the rotational gear;

a locking member having a hooking part facing the rack gear;

a spring member pushing the hooking part toward the rack gear; and a rotary damper coupled to one end of a rotational shaft of the opening/closing cover, wherein the rotational gear is provided in the other end of the rotational shaft of the opening/closing cover, and the hooking part restricts a sliding of the rack gear in an opened state of the opening/closing cover.

8. The locking mechanism according to claim 7, wherein the rack gear has a projection projecting toward the locking member, and the hooking part hooks the projection to restrict the sliding of the rack gear in the opened state of the opening/closing cover.

9. The locking mechanism according to claim 8, wherein the rack gear is slidable along a front-and-rear direction, and the projection is projected from a rear end portion of a lower surface of the rack gear.

10. The locking mechanism according to claim 7, wherein the locking member is turnable, and the hooking part is formed in a front end portion of the locking member so as to project toward the rack gear.

11. An image forming apparatus comprising:

the locking mechanism according to claim 7; and the opening/closing cover kept in the opened state using the locking mechanism.

12. A locking mechanism for an opening/closing cover supported by an apparatus case in an openable and closable manner, the locking mechanism comprising:

a rotational gear rotating with an opening and closing operation of the opening/closing cover;

a rack gear sliding with a rotating of the rotational gear;

a locking member having a hooking part facing the rack gear; and a spring member pushing the hooking part toward the rack gear, wherein the rack gear is slidable along a front-and-rear direction, the rack gear has a projection projected from a rear end portion of a lower surface of the rack gear toward the locking member, and the hooking part hooks the projection to restrict the sliding of the rack gear in an opened state of the opening/closing cover.

13. The locking mechanism according to claim 12, wherein the locking member is turnable, and the hooking part is formed in a front end portion of the locking member so as to project toward the rack gear.

14. An image forming apparatus comprising:

the locking mechanism according to claim 12; and the opening/closing cover kept in the opened state using the locking mechanism.

* * * * *